US005608191A

United States Patent [19]

Miguel Jorda Teixido

[11] Patent Number: 5,608,191
[45] Date of Patent: Mar. 4, 1997

[54] METAL PLATE SLEEVE AND METHOD OF MANUFACTURE

[75] Inventor: D. Miguel Jorda Teixido, Valls, Spain

[73] Assignee: United Technologies Automotive, Inc., Dearborn, Mich.

[21] Appl. No.: 45,442

[22] Filed: Apr. 8, 1993

[51] Int. Cl.$^6$ .................................................. H01B 17/26
[52] U.S. Cl. .............................................................. 174/151
[58] Field of Search ................................ 174/151, 65 R, 174/65 G, 65 SS, 152 R, 153 G; 439/556, 559

[56] References Cited

U.S. PATENT DOCUMENTS

| 2,563,829 | 8/1951 | Fitzgerald et al. | 174/65 SS X |
|---|---|---|---|
| 2,813,692 | 11/1957 | Bremer et al. | 248/56 |
| 4,289,924 | 9/1981 | Pearce, Jr. et al. | 174/152 G |
| 4,407,042 | 10/1983 | Schramme et al. | 16/2 |
| 4,859,812 | 8/1989 | Klosin et al. | 174/65 R X |
| 5,170,017 | 12/1992 | Stanevich et al. | 174/153 G |
| 5,266,051 | 11/1993 | Chupak | 439/559 |
| 5,278,357 | 1/1994 | Yamanashi | 174/151 |

FOREIGN PATENT DOCUMENTS

| 0179657 | 4/1986 | European Pat. Off. |
|---|---|---|
| 2569911 | 3/1986 | France . |
| 4017077 | 11/1991 | Germany . |
| 4208762 | 1/1993 | Germany .............................. 174/48 |
| 8804621 | 12/1987 | WIPO . |

Primary Examiner—Kristine L. Kincaid
Assistant Examiner—Paramita Ghosh
Attorney, Agent, or Firm—Ronald G. Cummings; William W. Habelt

[57] ABSTRACT

A metal plate sleeve and method of manufacture is obtained by placing the cables (15) on strips of rubber-base putty, then compressing the whole into the corresponding shape, followed by crown molding until the described shape of the anchoring zone (14) is obtained, forming a metal plate sleeve (10) for a bundle of cables (15), configured in accordance with the first lower truncated cone area (10b), extending on top into a cylindrical portion (21), which in turn extends on top into a truncated cone area (10a). A cylindrical portion (21) expands outward in accordance with the respective cover shields (12) and positioning shields (13).

3 Claims, 3 Drawing Sheets

METAL PLATE SLEEVE AND METHOD OF MANUFACTURE

TECHNICAL FIELD

This invention relates to electrical wiring and more particularly to a metal plate sleeve for such wiring and a method of manufacture having particular utility for automobile wire harnesses.

BACKGROUND OF THE INVENTION

In the automotive sector, and more concretely in components intended for the transport of electric energy, fluids and data, it is usual for the inside of an automobile cabin to be traversed by a number of cables and tubes, which usually are connected to each other by means of corresponding sleeves, where rubber lugs are used to pass through metal areas to which said sleeves conform, which allow such an assembly of cables or cable sleeves, and others, to pass from one compartment to another in the cabin, without said partition having undesirable effects on said cables, or sets of cables.

In practice, the sleeves that are used to protect the cables and permit passage from one part of the cabin to another, usually create a series of inconveniences that affect the quality of the car in general. The main difficulty with the sleeves used normally is that they noticeably alter the leakproof conditions for both liquids and sound, since the points at which parts of the cabin are traversed are the points where moisture, water and noise penetrate, with all the inconveniences this entails for the perfect finish and quality of the cabin in general.

The greater part of the cabin surface is covered by layers of soundproofing materials, which are placed inside the cabin and provide said soundproofing and also cover the metal parts, cable sleeves, small tubing, and others. In other words, when we say that parts or areas of the cabin are traversed, it should be understood that this assumes not only passing through metal parts, but also passing through areas lined with various materials; for that reason, it is extremely important that the fact alone of passing through the metal parts and the covers does not become one of the causes of the entrance of moisture and water, aside from noise, and that said water and moisture remain permanently between the metal parts of the cabin and the covered areas, which is actually one of the greatest problems that occur with respect to corrosion and degradation of materials, in other words, definitely any point of the cabin that must be perforated to permit passage of conductors and similar and, from the beginning, represents a possible focus for oxidation, loss of tightness and loss of soundproofing.

Basically, the sleeves that are presently and habitually used, serve to cover the perimeter of the perforated areas and, on the other hand, as a pressure medium for the perimeter against the conductors passing through the inside of said sleeves; nonetheless, and although the raw materials used to manufacture said sleeves are elastic materials, and therefore have the capacity to absorb by compression, the passage inside said sleeves of various cables which, in the majority of cases, are not perfectly aligned but rather braided, is not perfectly leakproof, while at the same time said sleeves are not a strong point through which the sleeve and cables can be attached to the perimeters or edges of the perforated areas, all of it in conjunction with the above indicated difficulties.

SUMMARY OF THE INVENTION

To solve the above difficulties and to add the positioning function to that of protection, a sleeve has been designed in accordance with the subject of the present invention, which both performs the function of the metal plate and ensures total leak-proofing against liquids and noise, according to its manufacturing process. This is a component manufactured over a bundle of cables or a harness, under one of the following processes:

a) By pressure spraying a hot glue between the cables enclosed in a mold of the below described shape, where the cables have previously been twisted and counter-twisted while under compression.

b) The cables are placed on rubber-base putty strips, the assembly is then compressed and given the shape described below.

The second phase of the manufacturing process consists in crown molding a plastic over these cables, which is strong and flexible to perform the simultaneous functions of joint, leak-proof seal and soundproofing.

This plastic joins the bundle (cable harness) and a plate of hard plastic or other material, which serves to attach the assembly to the wall separating two compartments of the cabin; not only the inside where the passengers travel are considered as such, but also the engine compartment or, for example, the trunk or rear area of the cabin in general, as well.

BRIEF DESCRIPTION OF THE DRAWINGS

Other details and characteristics of this patent application will be explained in the following description, with reference to the drawings accompanying this report, which depict the preferred details in a somewhat schematic form. These details are provided as examples, referring to a possible practical realization, but there is no limit to the details explained herein; this description should therefore be considered from an illustrative point of view, without limitations of any kind.

The following depicts the various numbered elements in the drawings attached to this report: (10) metal plate sleeve, (10a) upper truncated cone area, (10b) lower truncated cone area, (11) cable sleeve, (12) cover shield, (13) positioning shield, (14) anchoring zone, (15) electrical cables, (16) positioning lugs, (17) threaded cylindrical cavity, (18) plate or partition, (19) retainer lugs, (20) disk zone, (21) cylindrical portion, (22) cover panel.

DETAILED DESCRIPTION OF THE INVENTION

Figure 1:
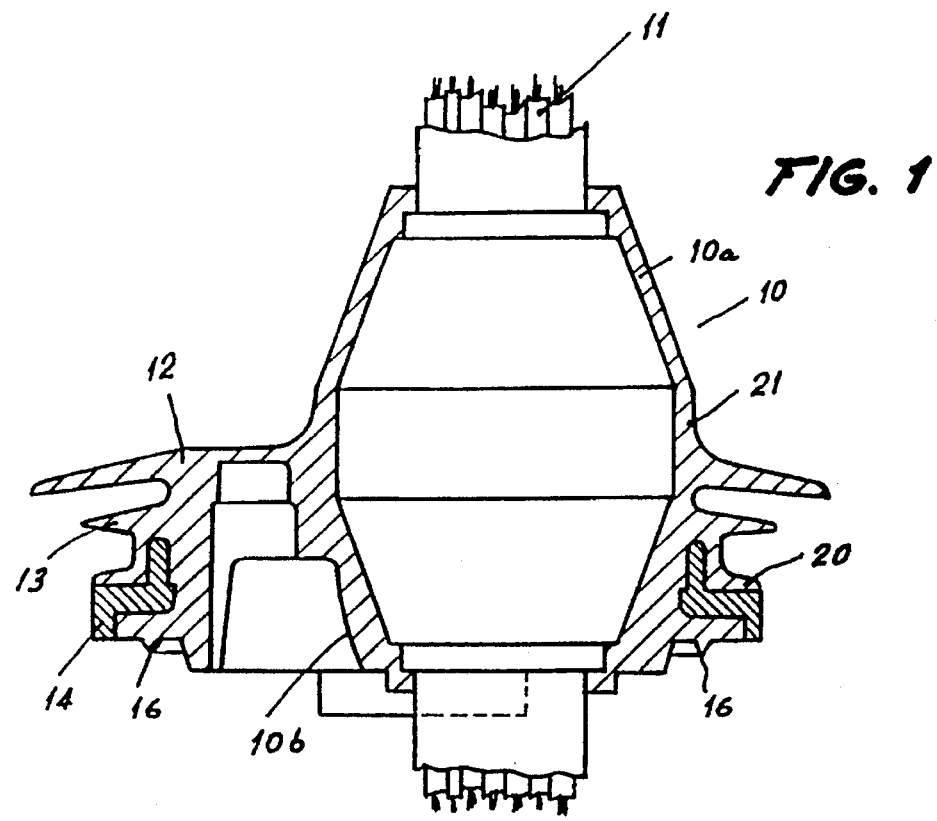
FIG. 1 is a longitudinal cross section of the metal plate sleeve (10), which covers a cable jacket or bundle (11), and includes an anchoring zone (14) in its structure.
Figure 2:
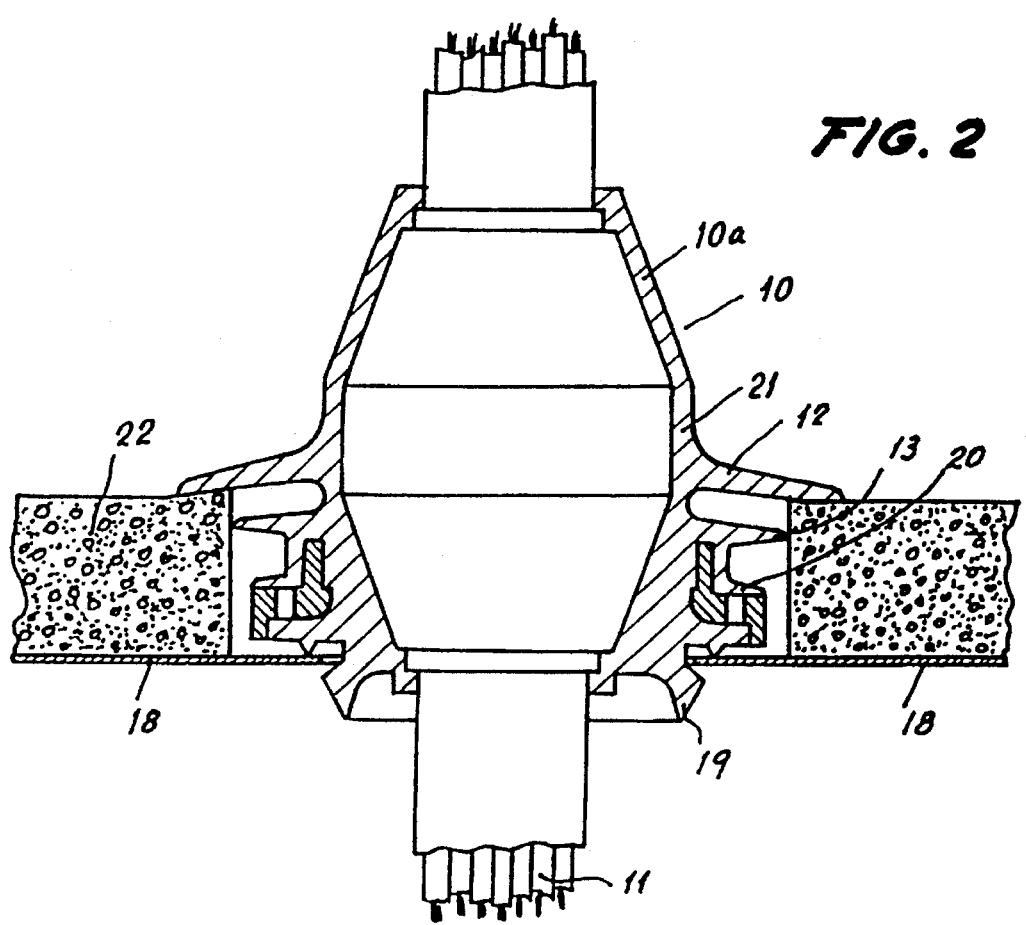
FIG. 2 is a configuration according to FIG. 1, for another type of application, but based on the same process and product.

In one of the preferred configurations of the subject of this patent application and the metal plate sleeve (10), as can be seen in FIGS. 1 and 2, has a configuration formed by a first lower truncated cone area (10b), extending on top into a cylindrical portion (21), which in turn extends on top into a truncated cone area (10a).

Figure 3:
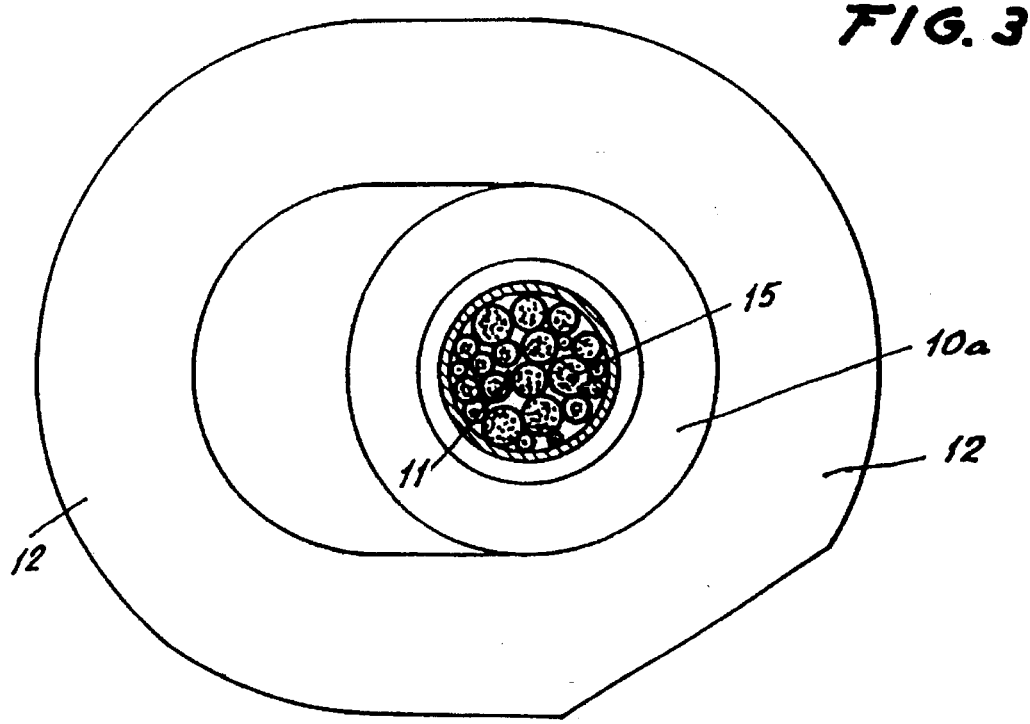
FIG. 3 is a top view of the metal plate sleeve (10).
Figure 4:
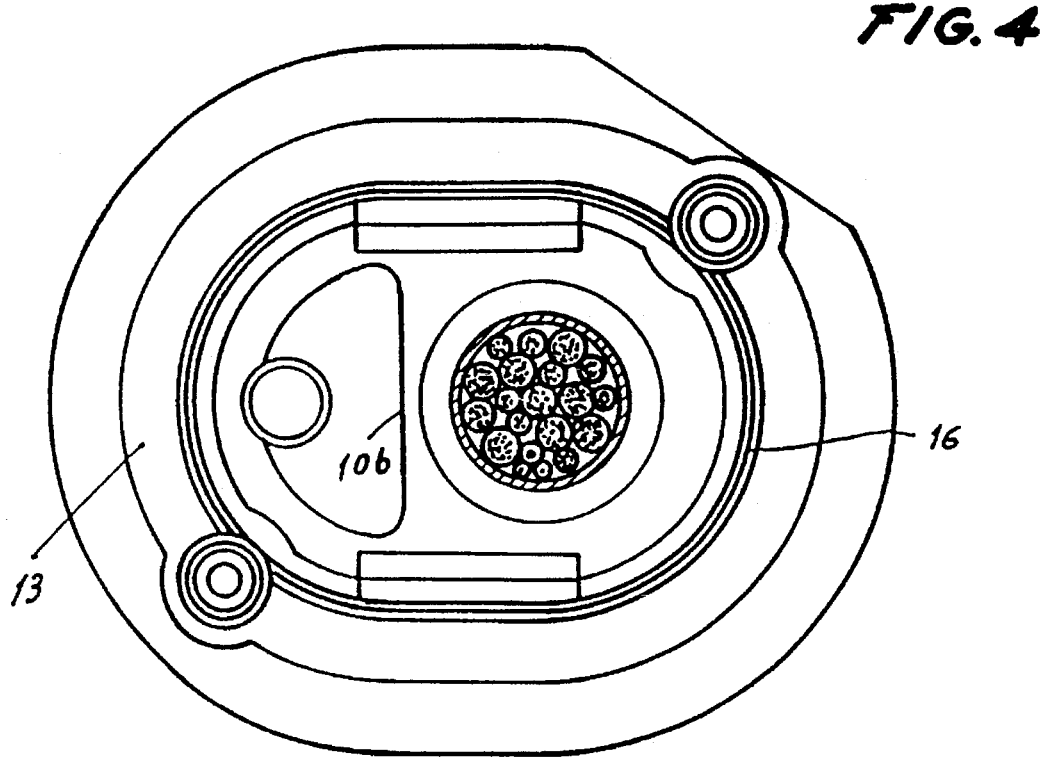
FIG. 4 is a bottom view of the metal plate sleeve (10).
Figure 5:
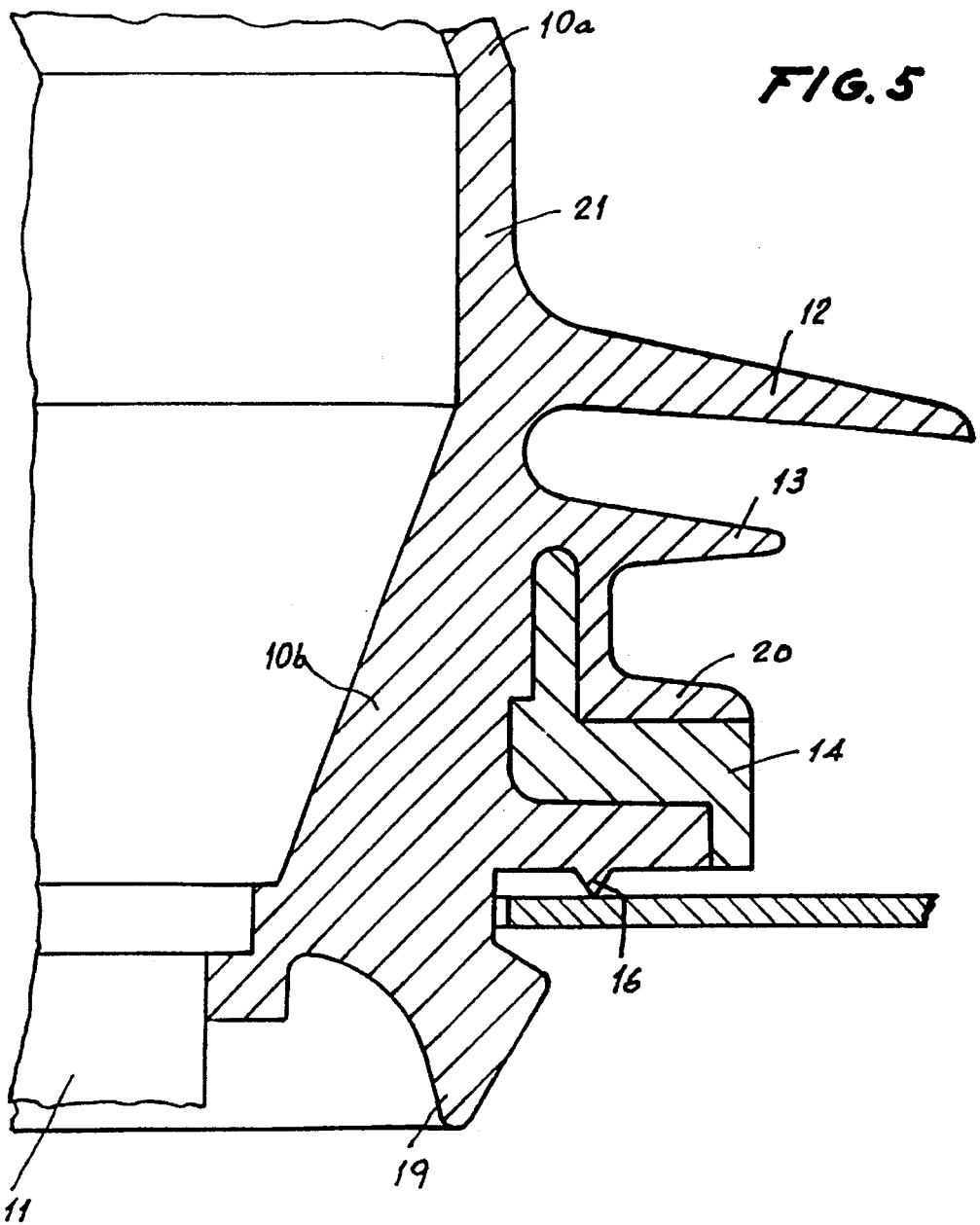
FIG. 5 is an enlarged partial longitudinal cross section of FIG. 2.

The cylindrical portion (21) expands outward in accordance with the respective cover shields (12) and positioning shields (13), whose perimeter can be seen in FIGS. 3 and 4. The cover shield (12) partially covers the cover panel (22), see FIG. 2, while the positioning shield (13) simultaneously performs the function of positioning the metal plate sleeve (10) with respect to the cover shield (12), also ensures that neither water, nor moisture, nor noise can pass between the lower part of the shield (12) and the upper part of the panel (22), thanks to the plastic materials of which said sleeve (10) is constructed.

Figure 6:
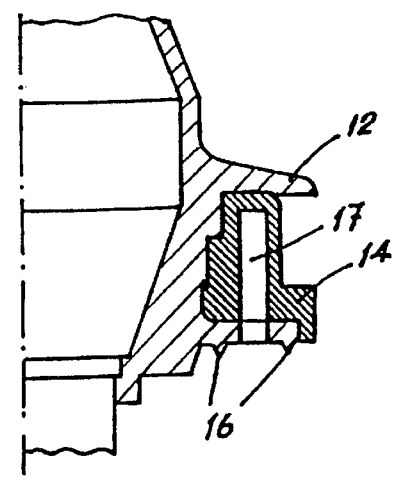
FIG. 6 is an enlarged partial longitudinal cross section of the anchoring zone (14).

A disk zone (20) is located under the positioning shield (13), which delimits a perimeter or cavity that is filled with a strong plastic, to act as an anchoring zone (14) if necessary, as can be seen in FIG. 6, and has a threaded or unthreaded cylindrical cavity (17), which allows the sleeve (10) to act as, or perform the function of, a metal plate for attachment to a plate or partition (18) of the automobile cabin.

Positioning lugs (16) protrude from the lower part of the disk zone (20), which serve as guides so that, once the sleeve (10) is placed in the automobile cabin and holds a panel (22) and passes through a plate (18), the corresponding screws can be placed into the cylindrical cavity (17) by an operator, so that the metal plate sleeve (10) is securely attached to the plate or partition (18).

The metal plate sleeve (10) may be manufactured in different ways, all equivalent with respect to shape and manufacturing process, which can be seen in FIGS. 1 and 2 and, although the metal plate sleeve (10) is basically the same, the configuration in FIG. 2 has some retainer lugs (19), so that the metal plate sleeve (10) is located between the positioning lugs (16) and the retainer lugs (19), keeping the plate or partition (18) between them.

As a minimum, the manufacturing process of the metal plate sleeve (10) comprises the following operations. First, the electric cables (15) are twisted or braided, then counter-twisted and subjected to compression, creating empty spaces between them, (which are filled by the hot glue and form the leakproof seal), by pressure spraying a hot glue between the cables enclosed in the mold, whose outside configuration is as described earlier for the metal plate sleeve (10).

Another way for the manufacturing process is placing the cables (15) on rubber-base putty strips, then compressing the whole and giving it a shape as described for the metal plate sleeve (10).

The above described manufacturing process for the metal plate sleeve (10) ensures total leakproofing when the cable harness (11), which is covered and has the shape described for (10), is fastened to the corresponding hole in the automobile cabin, since there is no open space left between the cables (15).

After examining the drawings and the explanation we have provided, it will be understood that the patent application for the invention, the subject of this report, provides a simple and effective construction that can very easily be put into practice, and constitutes a new industrial result, without any doubt.

Sufficiently described with regard to this patent application for the invention, in conjunction with the enclosed drawings, it is understood that any detail modifications that are deemed convenient may be introduced, as long as the essence of the patent, summarized in the following CLAIMS, is not altered.

I claim:

1. A method of manufacturing a leakproof seal about a plurality of longitudinally elongated, bundled cables, comprising the steps of:

compressing the bundled cables longitudinally so as to create a plurality of empty spaces between the bundled cables along a selected limited length of the bundled cables;

enclosing said selected limited length of the bundled cables in a cavity of a mold; and filling the plurality of empty spaces between the bundled cables with a hot glue whereby a leakproof seal is thereby formed about said selected limited length of the bundled cables.

2. A method of manufacture as recited in claim 1 further comprising the step of twisting and counter-twisting the bundled cables along said selected limited length thereof prior to compressing said selected limited length of the bundled cables longitudinally.

3. A method of manufacture as recited in claim 1 wherein the step of filling the plurality of empty spaces between the bundled cables with a hot glue comprises injecting the hot glue under pressure into the mold cavity enclosing said selected limited length of the bundled cables.

* * * * *